United States Patent
Sakamura et al.

(10) Patent No.: US 7,814,557 B2
(45) Date of Patent: Oct. 12, 2010

(54) IC CARD AND ACCESS CONTROL METHOD

(75) Inventors: Ken Sakamura, 4-9-2, Osaki, Shinagawa-ku, Tokyo 141-0032 (JP); Noboru Koshizuka, 2-27-20, Nishikubo, Musashino-shi, Tokyo 180-0013 (JP); Kazuhiko Ishii, Yokohama (JP); Masayuki Terada, Yokosuka (JP); Kensaku Mori, Yokohama (JP); Sadayuki Hongo, Yokohama (JP)

(73) Assignees: NTT DoCoMo, Inc., Tokyo (JP); Ken Sakamura, Tokyo (JP); Noboru Koshizuka, Musashino-shi (JP)

( * ) Notice: Subject to any disclaimer, the term of this patent is extended or adjusted under 35 U.S.C. 154(b) by 719 days.

(21) Appl. No.: 11/578,974

(22) PCT Filed: Apr. 21, 2005

(86) PCT No.: PCT/JP2005/007641

§ 371 (c)(1),
(2), (4) Date: Aug. 23, 2007

(87) PCT Pub. No.: WO2005/103910

PCT Pub. Date: Nov. 3, 2005

(65) Prior Publication Data

US 2008/0134341 A1    Jun. 5, 2008

(30) Foreign Application Priority Data

Apr. 21, 2004    (JP) ................ 2004-126045

(51) Int. Cl.
*G06F 7/04*    (2006.01)
*G06F 17/30*    (2006.01)

(52) U.S. Cl. ................ 726/27; 726/2; 726/28; 726/29

(58) Field of Classification Search ............. 726/27–29, 726/2
See application file for complete search history.

(56) References Cited

U.S. PATENT DOCUMENTS 5,544,246 A    8/1996    Mandelbaum et al. ........ 380/23

(Continued)

FOREIGN PATENT DOCUMENTS

EP    0262025 A2    3/1988

(Continued)

OTHER PUBLICATIONS

Microsoft® Security Resource Kit By: Ben Smith; Komar Brian; Microsoft Security Team Publisher: Microsoft Press Pub. Date: Mar. 12, 2003 Print ISBN-10: 0-7356-1868-2 Print ISBN-13: 978-0-7356-1868-8.*

*Primary Examiner*—Minh Dieu Nguyen
(74) *Attorney, Agent, or Firm*—Oblon, Spivak, McClelland, Maier & Neustadt, L.L.P.

(57) ABSTRACT

A folder containing at least one file can be created in a file storage (17) in response to a folder creation request from an owner (30) of an IC card (10), and an access authority to the folder can be set as an access control list (18A) of the folder in response to an access authority setting request from the owner (30). Then access to the file is controlled not only on the basis of the access authority to the file set by an issuer of a voucher (issuer of the file), but also on the basis of the access authority to the folder set by the owner (30).

3 Claims, 4 Drawing Sheets

U.S. PATENT DOCUMENTS

| | | |
|---|---|---|
| 5,563,395 A | 10/1996 | Hoshino |
| 6,003,769 A * | 12/1999 | Ebbing .................. 235/380 |
| 6,173,401 B1 * | 1/2001 | Deindl et al. .............. 713/176 |
| 2003/0047936 A1* | 3/2003 | Falcon et al. .................. 283/62 |
| 2004/0221118 A1* | 11/2004 | Slater et al. ................. 711/163 |
| 2005/0044399 A1* | 2/2005 | Dorey ........................ 713/200 |

FOREIGN PATENT DOCUMENTS

| | | |
|---|---|---|
| EP | 0583006 A2 | 2/1994 |
| EP | 0 644 513 A2 | 3/1995 |
| EP | 1117077 A2 | 7/2001 |
| EP | 1202208 A1 | 5/2002 |
| EP | 1204080 A1 | 5/2002 |
| GB | 2350703 A | 12/2000 |
| JP | 7 152837 | 6/1995 |
| JP | 2000 163533 | 6/2000 |

* cited by examiner

Fig.4

|  | COPY | ASSIGNMENT | ISSUER ID |
|---|---|---|---|
| FILE 1 | PROHIBITED | ASSIGNMENT | 00003 |
| FILE 2 | PROHIBITED | PROHIBITED | 00006 |
| FILE 3 | PROHIBITED | PROHIBITED | 00100 |
| ⋮ |  |  |  |

18B

IC CARD AND ACCESS CONTROL METHOD

TECHNICAL FIELD

The present invention relates to an IC card in which a voucher file can be created, and an access control method of controlling access to the voucher file created in the IC card.

BACKGROUND ART

The currently circulating IC cards include a lot of IC cards used without authentication of an owner, and a person obtaining such an IC card can browse or use the contents of the IC card.

Of course, IC cards used with authentication of an owner also have been proposed heretofore (cf. Patent Document 1 below) though they are still a minority.

Patent Document 1 is Japanese Patent Application Laid-Open Gazette No. 2000-163533.

DISCLOSURE OF THE INVENTION

Problem to be Solved by the Invention

However, most of the IC cards with authentication of the owner are of a type in which only a single access authority can be set for an entire IC card, and there is still room for improvement to permit finer setting of access authority.

Meanwhile, the conventional technology generally permits an issuer of a voucher file to freely define a use rule of the voucher file issued by itself and to manipulate the voucher file on the basis of the use rule. Namely, an owner of an IC card holding a voucher file needs to follow a use rule defined by an issuer, when using the voucher file.

For this reason, for example, in a case where an owner of an IC card holding plural types of voucher files desires to freely select which voucher file is to be used in use of those voucher files and where an issuer preliminarily defines a use rule, the owner of the IC card must follow the use rule and it cannot always get along with the desire of the owner.

On the other hand, it is not always preferred in terms of security that the owner of the IC card be allowed to freely falsify or set an access authority to a held voucher file.

There were thus desires for access control to the voucher file adapted to the desire of the owner of the IC card while assuring the security of the voucher file in the IC card.

The present invention has been accomplished in order to solve the above problem, and an object of the invention is to provide an IC card and an access control method capable of achieving flexible access control to a voucher file while assuring the security of the voucher file in an IC card.

Means for Solving the Problem

In order to achieve the above object, an IC card according to the present invention comprises file creating means for, in response to a voucher file creation request from a communication partner, creating a voucher file while defining the communication partner as a voucher issuer; file access authority setting means for, in response to an access authority setting request from the communication partner as the voucher issuer, setting an access authority to the created voucher file; folder creating means for, in response to a folder creation request from an owner to request creation of a folder containing at least one voucher file, creating a folder; folder access authority setting means for, in response to an access authority setting request from the owner, setting an access authority to the created folder; and access controlling means for controlling access to the voucher file, based on at least one of the set access authority to the voucher file and the set access authority to the folder containing the voucher file.

An access control method according to the present invention comprises a file creating step of, in response to a voucher file creation request from a communication partner, creating a voucher file in an IC card while defining the communication partner as a voucher issuer; a file access authority setting step of, in response to an access authority setting request from the communication partner as the voucher issuer, setting an access authority to the created voucher file; a folder creating step of, in response to a folder creation request from an owner of the IC card to request creation of a folder containing at least one voucher file, creating a folder in the IC card; a folder access authority setting step of, in response to an access authority setting request from the owner, setting an access authority to the created folder; and an access controlling step of, when receiving an access request for access to the voucher file in the IC card, controlling access to the voucher file, based on at least one of the set access authority to the voucher file and the set access authority to the folder containing the voucher file.

In the invention as described above, a folder containing at least one voucher file can be created in response to a folder creation request from the owner and an access authority can be set to the folder in response to an access authority setting request from the owner, in view of the fact that it is not preferred in terms of security that the owner of the IC card be allowed to freely falsify or set an access authority to the voucher file held in the IC card. Then the access to the voucher file is controlled based on at least one of the set access authority to the voucher file and the set access authority to the folder.

In this configuration, the access control to the voucher file is carried out not only on the basis of the access authority to the voucher file set by the voucher issuer, but also on the basis of the access authority to the folder set by the owner of the IC card. Namely, it is feasible to achieve the access control to the voucher file adapted to the desire of the owner of the IC card while assuring the security of the voucher file in the IC card.

Effect of the Invention

The present invention enables the flexible access control to the voucher file while assuring the security of the voucher file in the IC card.

BRIEF DESCRIPTION OF THE DRAWINGS

FIG. 4 is a drawing showing an example of an access control list of files in folder 1.

DESCRIPTION OF REFERENCE SYMBOLS 10 is for IC card; 11 is for authenticator; 11A is for ID certificate; 12 is for file creator; 13 is for file access authority setter; 14 is for folder creator; 15 is for folder access authority setter; 16 is for access controller; 17 is for file storage; 18 is for access control list storage; 18A is for access control list of folders; 18B is for access control list of files; 20 is for communication partner; 30 is for owner.

BEST MODE FOR CARRYING OUT THE INVENTION

An embodiment of the IC card and access control method according to the present invention will be described below.

Figure 1:
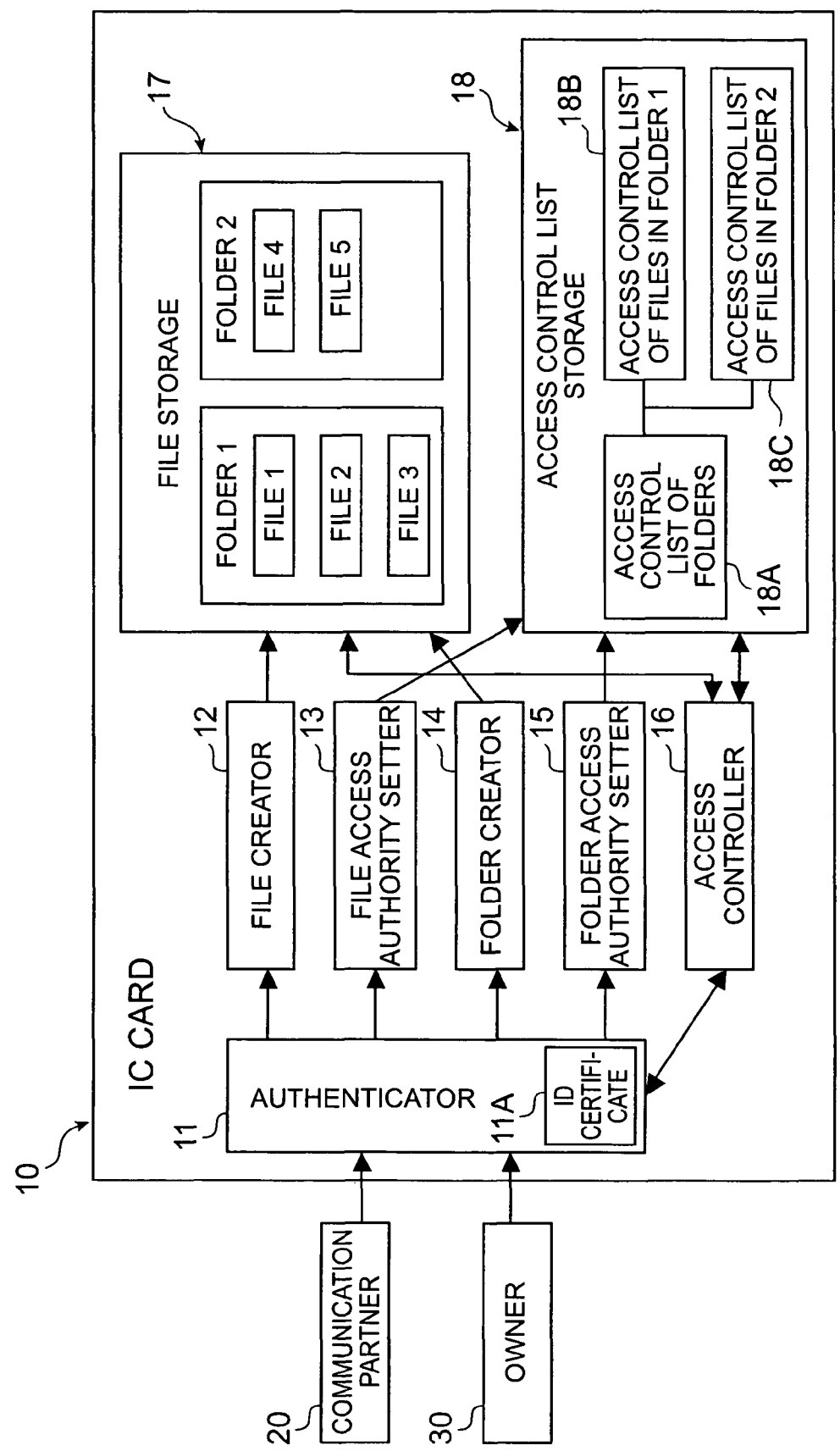
FIG. 1 is a functional block diagram showing a configuration of an IC card in an embodiment of the invention.

FIG. 1 is a functional block diagram showing a configuration of IC card 10. As shown in this FIG. 1, IC card 10 comprises an authenticator 11 for authenticating both or one of communication partner 20 and owner 30 of the IC card 10 according to an authentication mode described later; file creator 12 for creating a voucher file (hereinafter referred to simply as "file") while defining the communication partner 20 as a voucher issuer, in response to a voucher file creation request from the communication partner 20; file access authority setter 13 for setting an access authority to a file in response to an access authority setting request from the communication partner 20 as the voucher issuer; folder creator 14 for creating a folder in response to a folder creation request from the owner 30 to request creation of a folder containing at least one file; folder access authority setter 15 for setting an access authority to a folder in response to an access authority setting request from the owner 30; access controller 16 for controlling access to the file, based on at least one of the set access authority to the file and the set access authority to the folder; file storage 17 for storing folders and files in the folders; and access control list storage 18 for storing information about the set access authorities to the files and the set access authorities to the folders in a list form.

The IC card 10 can be one of IC cards existing in the same configuration, and each IC card is preliminarily assigned unique identification information (hereinafter referred to as "ID"). An IC certificate 11A to certify the ID is stored in the authenticator 11.

Communication by the IC card 10 will be outlined below.

The communication by IC card 10 includes communication in which IC card 10 authenticates a communicating partner, and communication in which IC card 10 does not authenticate a communicating partner. Among these, the "authentication" in the "communication with authentication" includes a case where owner 30 of the IC card 10 is authenticated, and a case where each other's authentication between IC cards is performed with another IC card (communication partner 20). It is seen from the above that there are three modes (authentication modes) in which IC card 10 controls authentication of an access partner by the authenticator 11, "owner authentication mode" to authenticate owner 30 of the IC card 10, "partner authentication mode" to authenticate each other's IC card with another IC card (communication partner 20), and "non-authentication mode" where the IC card 10 does not authenticate a communicating partner. Which authentication mode is to be adopted is specified by a communication partner and presented to IC card 10 at a start of communication with IC card 10.

Among these modes, the owner authentication mode is a mode of carrying out authentication with a password preliminarily stored in IC card 10 or with biometric information such as a fingerprint. In the partner authentication mode, two IC cards present each other's ID certificates and mutual authentication is carried out according to the conventionally known scheme of PKI (Public Key Infrastructure).

In the owner authentication mode and in the partner authentication mode, a new file can be created in IC card 10. At this time, issuer information to indicate who created the file is added to the created file. This information is an ID of the IC card of the owner 30 himself or herself in the owner authentication mode, or an ID of communication partner (other IC card) 20 in the partner authentication mode. These will be called "issuer ID" of the file.

When a new file is created in IC card 10 as described above, an issuer can put a restriction on access to the file (copy/assignment herein), e.g., on access from IDs other than the issuer ID. Namely, an issuer (creator of a file) can set an access control list of a file to control whether a person except for the issuer is allowed to execute copy/assignment of the file, upon creation of the file. Among the above access operations, copy corresponds to issue of a coupon ticket. Except for special cases, copy is set as "prohibited".

For example, as shown in FIG. 4, an access control list 18B of files stores information to indicate whether copy is permitted, information to indicate whether assignment is permitted, and issuer ID information for each of file 1, file 2, file 3, and so on. This access control list 18B of files is stored in access control list storage 18.

Next, the access control during communication in each of the modes will be outlined.

In communication in the owner mode, the owner is allowed to access files in IC card 10 (the details of which will be described later). The owner can put a restriction on other's creation/reading/assignment of a file in the IC card 10. At this time, there are cases where the owner desires to put a restriction on only some of files. Therefore, the owner is allowed to set a folder containing at least one file stored in the IC card 10 and to set an access control list to control whether a person except for the owner is allowed to perform creation/reading/assignment of each file in the folder, for the folder thus set. Among the above access operations, creation corresponds, for example, to inheritance of a voucher, and reading corresponds to balance inquiry of a voucher.

Figure 3:
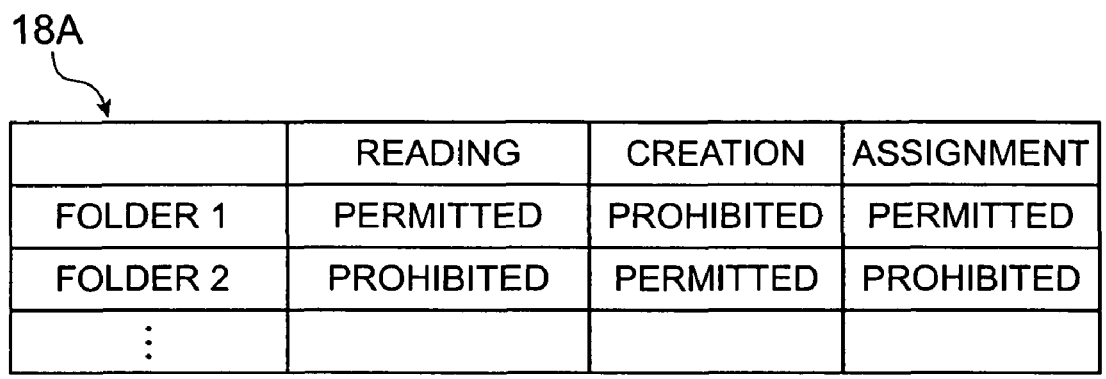
FIG. 3 is a drawing showing an example of an access control list of folders.

For example, as shown in FIG. 3, an access control list 18A of folders stores information to indicate whether reading is permitted, information to indicate whether creation is permitted, and information to indicate whether assignment is permitted, for each of folder 1, folder 2, and so on. The access control list 18A of folders is stored, as shown in FIG. 1, in association with access control lists 18B, 18C of files in the respective folders, in the access control list storage 18.

When the owner accesses the files in IC card 10 as an owner, the owner is free of the setting of the access control list of folders, but is subjected to the access control list set for the files.

When access to a file is made in communication in the mutual authentication mode, operation differs depending upon the issuer ID of the file. Namely, when the issuer ID is different from an ID of communication partner (other IC card) 20 accessing the file, the operation follows both of the access control list of folders containing files, and the access control list of files. On the other hand, when the issuer ID is the same as the ID of the accessing communication partner (other IC card) 20, the operation is free of the access control list of files. However, the operation follows the access control list of folders containing the files.

When access to a file is made in communication in the non-authentication mode, the operation always follows both of the access control list of folders containing the files, and the access control list of files. Namely, unless access is permitted in the both access control lists, access to the file will be unsuccessful.

A specific flow of processing will be described below along the flowchart of FIG. 2.

Figure 2:
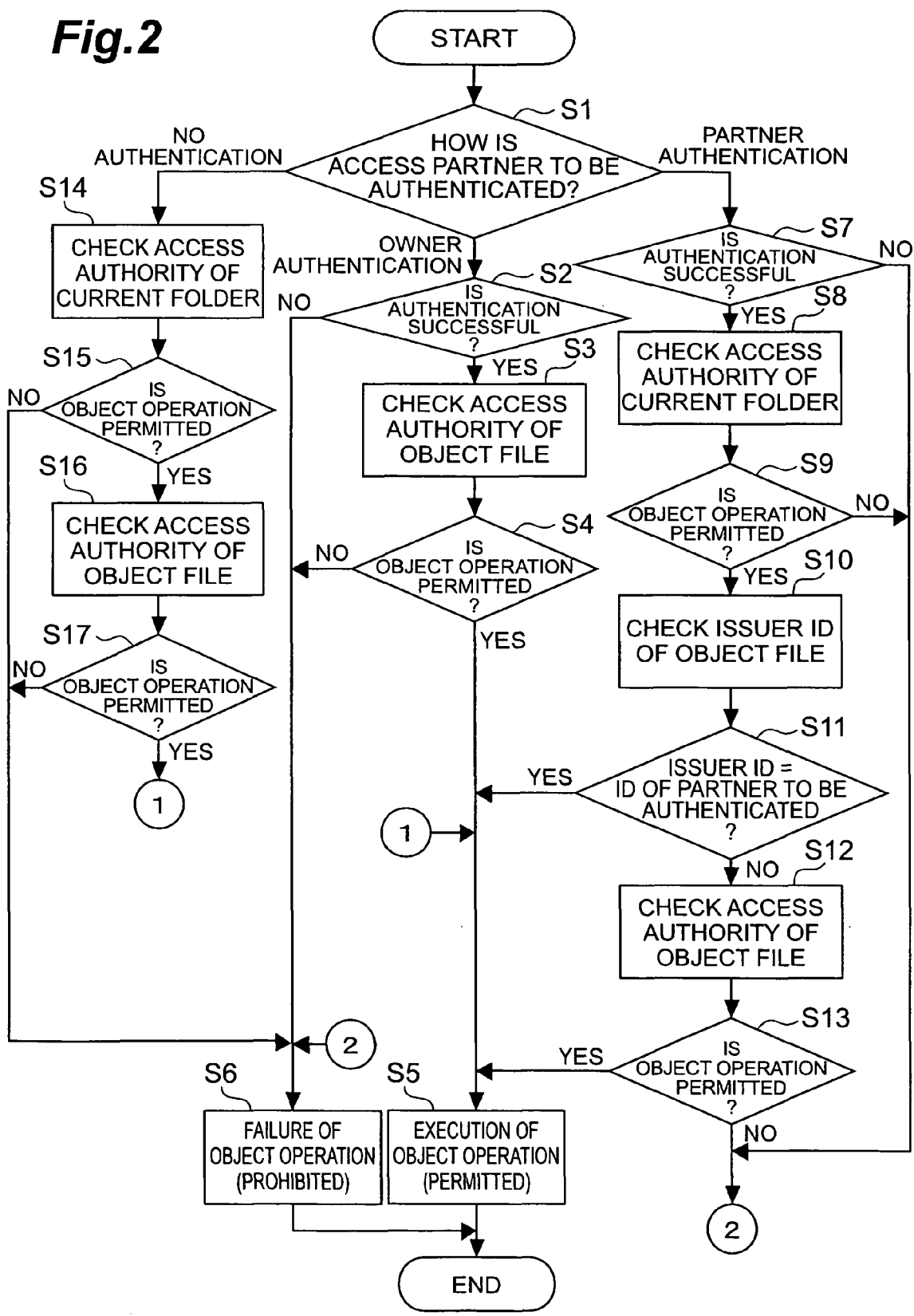
FIG. 2 is a flowchart showing contents of an access control process.

At the first step S1 in FIG. 2 the authenticator 11 determines how an access partner is to be authenticated (i.e., which authentication mode is designated), based on the authentication mode information designated by the access partner at a start of communication.

When the result of the determination is the owner authentication mode, the processing proceeds to S2, where the authenticator 11 executes the predetermined authentication process in the owner authentication mode. Namely, as described previously, the authentication is performed based on a password preliminarily stored in the IC card 10 or based on biometric information such as a fingerprint. When the authentication at this step S2 is unsuccessful, the processing proceeds to S6 to determine an object operation as prohibited and end in failure. When the authentication at S2 is successful, the processing proceeds to S3, where the access controller 16 checks the access authority of the object file. Namely, in the case of the owner authentication mode, access is free of the setting of the access control list of folders and thus there is no need for checking the access authority of the folder. Then the access controller 16 determines whether the check at S3 results in permission of the object operation (S4). If the object operation is not permitted, the processing proceeds to S6 to determine the object operation as prohibited and end in failure. On the other hand, if the object operation is permitted at S4, the processing proceeds to S5 to determine the object operation as permitted and move to execution.

When the result of the determination at S1 is the partner authentication mode, the processing proceeds to S7, where the authenticator 11 executes the predetermined authentication process in the partner authentication mode. Namely, as described previously, the IC cards present each other's ID certificates, and mutual authentication is carried out according to the conventionally known scheme of PKI. When the authentication at this step S7 is unsuccessful, the processing proceeds to S6 to determine the object operation as prohibited and end in failure. When the authentication at S7 is successful, the processing proceeds to S8, where the access controller 16 checks the access authority of the current folder. Then the access controller 16 determines whether the check at S8 results in permission of the object operation (S9). If the object operation is not permitted, the processing proceeds to S6 to determine the object operation as prohibited and end in failure. On the other hand, if the object operation is permitted at S9, the processing proceeds to S10, where the access controller 16 checks the issuer ID of the object file. The subsequent step S11 is to determine whether the issuer ID of the object file is the same as the ID of the partner to be authenticated.

When the issuer ID of the object file is the same as the ID of the partner to be authenticated, the partner to be authenticated can be determined to be the issuer of the object file, and thus the check of the access authority of the object file can be skipped. Therefore, the processing proceeds to S5 to determine the object operation as permitted and move to execution.

On the other hand, if the issuer ID of the object file is different from the ID of the partner to be authenticated, the partner to be authenticated can be determined not to be the issuer of the object file, and it is thus necessary to check the access authority of the object file. Then the processing proceeds to S12, where the access controller 16 checks the access authority of the object file. Then the access controller 16 determines whether the check at S12 results in permission of the object operation (S13). If the object operation is not permitted, the processing proceeds to S6 to determine the object operation as prohibited and end in failure. On the other hand, if the object operation is permitted at S13, the processing proceeds to S5 to determine the object operation as permitted and move to execution.

In the partner authentication mode as described above, when the issuer ID is different from the ID of the communication partner (other IC card) 20 accessing the file, the operation follows both of the access control list of the folder containing the file, and the access control list of the file; when the issuer ID is the same as the ID of the communication partner (other IC card) 20 accessing the file, the operation is free of the access control list of the file, but is subjected to the access control list of the folder containing the file.

Furthermore, when the result of the determination at S1 is the non-authentication mode, the processing proceeds to S14, where the access controller 16 checks the access authority of the current folder. Then the access controller 16 determines whether the check at S14 results in permission of the object operation (S15). If the object operation is not permitted, the processing proceeds to S6 to determine the object operation as prohibited and end in failure. On the other hand, if the object operation is permitted at S15, the processing proceeds to S16, where the access controller 16 checks the access authority of the object file. Then the access controller 16 determines whether the check at S16 results in permission of the object operation (S17). If the object operation is not permitted, the processing proceeds to S6 to determine the object operation as prohibited and end in failure. On the other hand, if the object operation is permitted at S17, the processing proceeds to S5 to determine the object operation as permitted and move to execution. In the non-authentication mode as described above, the operation always follows both of the access control list of the folder containing the file and the access control list of the file For example, in a case where in the partner authentication mode the communication partner 20 (with the ID of 00006) reads file 2 in folder 1 being the current folder, the processing moves from S1 to S7 in FIG. 2. After the authentication at S7 is successful, S8 results in obtaining "permitted" as the access authority information of "reading" about the folder 1, from the access control list 18A of the folder. Since the object operation "reading" is thus permitted, the processing proceeds to S10 to obtain "00006" as the issuer ID of the object file (file 2) from the access control list 18B of the file in folder 1. For this reason, the next step S11 results in determining that the issuer ID of the object file (file 2) is the same as the ID "00006" of the partner to be authenticated and thus the processing proceeds to S5, without checking the access authority of the object file (file 2); therefore, the object operation (reading of file 2) is determined as permitted and thus is executed.

According to the embodiment of the invention, as described above, the access control to the file is carried out not only on the basis of the access authority to the file set by the issuer of the file, but also on the basis of the access authority to the folder set by the owner of the IC card; therefore, the flexible file access control adapted to the desire of the owner of the IC card can be realized while assuring the security of the file in the IC card.

The above embodiment described the example where the authentication modes are the three modes of the owner authentication mode, the partner authentication mode, and the non-authentication mode, but it is noted that the present invention is by no means limited to this example and that another modification form may also be adopted, e.g., a scheme without the non-authentication mode.

INDUSTRIAL APPLICABILITY

The present invention is applicable to any IC card in which a voucher file can be created, and to any access control method of controlling the access to the voucher file created in the IC card, and achieves the flexible access control to the voucher file while assuring the security of the voucher file in the IC card.

The invention claimed is:

1. An IC card, comprising:
   file creating means for, in response to a voucher file creation request from a communication partner, creating a voucher file while defining the communication partner as a voucher issuer;
   file access authority setting means for, in response to an access authority setting request from the communication partner as the voucher issuer, setting an access authority to the voucher file;
   folder creating means for, in response to a folder creation request from an owner to request a creation of a folder containing the voucher file, creating the folder;
   folder access authority setting means for, in response to an access authority setting request from the owner, setting an access authority to the folder;
   access controlling means for controlling an access to the voucher file, based on at least one of the access authority to the voucher file and the access authority to the folder containing the voucher file; and
   an authenticator configured to determine how an access partner is to be authenticated, among an owner authentication mode, a partner authentication mode, and a non-authentication mode, based on authentication mode information designated by the access partner at a start of a communication, wherein
   the access controlling means,
      if a predetermined authentication process in the owner authentication mode, which is executed by the authenticator, is successful, checks the access authority of the voucher file; and if an object operation is permitted, executes the object operation,
      if a predetermined authentication process in the partner authentication mode, which is executed by the authenticator, is successful, checks the access authority of the folder; if an object operation is permitted, checks whether an identity of the voucher issuer of the voucher file is the same as an identity of the access partner; when the identity of the voucher issuer of the voucher file is the same as the identity of the access partner, executes the object operation; if the identity of the voucher issuer of the voucher file is different from the identity of the access partner, checks the access authority of the voucher file; and if the object operation is permitted, executes the object operation; and
      in a non-authentication mode, checks the access authority of the folder; if an object operation is permitted, checks the access authority of the voucher file; and if the object operation is permitted, executes the object operation.

2. An access control method, comprising:
   in response to a voucher file creation request from a communication partner, creating a voucher file in an IC card while defining the communication partner as a voucher issuer;
   in response to an access authority setting request from the communication partner as the voucher issuer, setting an access authority to the voucher file;
   in response to a folder creation request from an owner of the IC card to request a creation of a folder containing the voucher file, creating the folder in the IC card;
   in response to an access authority setting request from the owner, setting an access authority to the folder;
   when receiving an access request for an access to the voucher file in the IC card, controlling the access to the voucher file, based on at least one of the access authority to the voucher file and the access authority to the folder containing the voucher file; and
   determining how an access partner is to be authenticated, among an owner authentication mode, a partner authentication mode, and a non-authentication mode, based on authentication mode information designated by the access partner at a start of a communication, wherein
   the controlling includes
      if a predetermined authentication process in the owner authentication mode is successful, checking the access authority of the voucher file; and if an object operation is permitted, executing the object operation;
      if a predetermined authentication process in the partner authentication mode is successful, checking the access authority of the folder; if an object operation is permitted, checking whether an identity of the voucher issuer of the voucher file is the same as an identity of the access partner; when the identity of the voucher issuer of the voucher file is the same as the identity of the access partner, executing the object operation; if the identity of the voucher issuer of the voucher file is different from the identity of the access partner, checking the access authority of the voucher file; and if the object operation is permitted, executing the object operation; and
      in the non-authentication mode, checking the access authority of the folder; if an object operation is permitted, checking the access authority of the voucher file; and if the object operation is permitted, executing the object operation.

3. An IC card, comprising:
   a file creator that, in response to a voucher file creation request from a communication partner, creates a voucher file while defining the communication partner as a voucher issuer;
   a file access authority setter that, in response to an access authority setting request from the communication partner as the voucher issuer, sets an access authority to the voucher file;
   a folder creator that, in response to a folder creation request from an owner to request a creation of a folder containing the voucher file, creates the folder;
   a folder access authority setter that, in response to an access authority setting request from the owner, sets an access authority to the folder;
   an access controller that controls an access to the voucher file, based on at least one of the access authority to the voucher file and the access authority to the folder containing the voucher file; and
   an authenticator configured to determine how an access partner is to be authenticated, among an owner authentication mode, a partner authentication mode, and a non-authentication mode, based on authentication mode information designated by the access partner at a start of a communication, wherein
   the access controller is configured to
      if a predetermined authentication process in the owner authentication mode, which is executed by the authenticator, is successful, check the access authority of the voucher file; and if an object operation is permitted, to execute the object operation,
      if a predetermined authentication process in the partner authentication mode, which is executed by the authenticator, is successful, check the access authority of the folder; if an object operation is permitted, to check whether an identity of the voucher issuer of the voucher file is the same as an identity of the access partner; when the identity of the voucher issuer of the voucher file is the same as the identity of the access partner, to execute the object operation; if the identity of the voucher issuer of the voucher file is different from the identity of the access partner, to check the access authority of the voucher file; and if the object operation is permitted, to execute the object operation; and in a non-authentication mode, check the access authority of the folder; if an object operation is permitted, to check the access authority of the voucher file; and if the object operation is permitted, to execute the object operation.

* * * * *